United States Patent [19]

Ohmi et al.

[11] Patent Number: 5,667,133
[45] Date of Patent: Sep. 16, 1997

[54] METHOD AND APPARATUS FOR FORMING AN OXIDE PASSIVATION FILM ON A WELD

[75] Inventors: Tadahiro Ohmi, 1-17-301, Komegabukuro 2-chome, Aoba-ku Sendai-shi Miyagi-ken 980; Masakazu Nakamura, Saitama-ken, both of Japan

[73] Assignees: Tadahiro Ohmi; Osaka Sanso Kogyo Ltd., both of Japan

[21] Appl. No.: 343,429

[22] PCT Filed: May 28, 1993

[86] PCT No.: PCT/JP93/00720

§ 371 Date: Nov. 23, 1994

§ 102(e) Date: Nov. 23, 1994

[87] PCT Pub. No.: WO93/24267

PCT Pub. Date: Dec. 9, 1993

[30] Foreign Application Priority Data

May 29, 1992 [JP] Japan .................. 4-164376
Nov. 13, 1992 [JP] Japan .................. 4-304142

[51] Int. Cl.⁶ ............................................. B23K 9/16
[52] U.S. Cl. ........................... 228/219; 219/72; 219/75
[58] Field of Search ............................ 228/218–220, 228/42; 219/137 R, 72, 74, 75

[56] References Cited

U.S. PATENT DOCUMENTS 3,584,187  6/1971  Majetich ................ 219/137 R
3,689,725  9/1972  Hammer et al. ............ 219/67
5,396,039  3/1995  Chevrel et al. ............ 219/74

FOREIGN PATENT DOCUMENTS 53-43649  4/1978  Japan .
64-31956  2/1989  Japan .

*Primary Examiner*—Samuel M. Heinrich
*Attorney, Agent, or Firm*—Baker & Daniels

[57] ABSTRACT

A welding method for forming an oxide passivation film having corrosion resistance and an extremely small emission quantity of an outgas during welding at a weld portion and portions nearby, and a process apparatus requiring an ultrahigh-clean atmosphere. A back-shielding gas comprising an inert gas containing 1 ppb to 50 ppm of oxygen gas is caused to flow during a welding process, and an oxide passivation film comprising chromium oxide as a principal component is formed on the surface of the weld portion. In a process apparatus using welding for installing the apparatus, a back-shielding gas comprising an inert gas containing 1 ppb to 50 ppm of oxygen gas is caused to flow during a welding process and an oxide passivation film comprising chromium oxide as a principal component is formed on the surface of a weld portion.

6 Claims, 5 Drawing Sheets

METHOD AND APPARATUS FOR FORMING AN OXIDE PASSIVATION FILM ON A WELD

BACKGROUND OF THE INVENTION

1. Field of the Invention

The present invention generally relates to a welding method for forming an oxide passivation film on a weld and a process apparatus, and more particularly relates to a welding method making it possible to form an oxide passivation film mainly made of a chromium oxide film on the surface of a weld simultaneously with welding.

2. Description of the Related Prior Art

The integration level and the performance of a semiconductor device have been improved, a semiconductor device fabricating apparatus meeting the requests has been requested, and efforts for creating a higher-vacuum and higher-cleanliness atmosphere have been made.

To create an ultrahigh-vacuum and very-high-cleanliness atmosphere, it is necessary to completely control the out-gas discharged from the apparatus or a gas feeding piping system. The inventors of the present invention completed an oxide passivation film treating method after long-time research and development, thereby making it is possible to form an oxide passivation film having corrosion resistance and a very small quantity of out-gas and mainly containing chromium oxide on the surface of a weld. As a result, they succeeded in creating an atmosphere containing only a very small quantity of out-gas discharged from the apparatus, which cannot be detected by an existing measuring instrument.

However, as the apparatus is further increased in size and further complicated, the necessity for connecting a pipe with the apparatus after forming an oxide passivation film has increased. A new problem occurs wherein the atmosphere is contaminated because a weld is not covered with an oxide passivation, film, gas is easily absorbed into or removed from the weld therefor. Therefore when the welded places are increased, the out-gas quantity discharged from the welds cannot be ignored.

Moreover, an apparatus and a piping system using a corrosive gas has a problem in that the weld corrodes and thereby contaminates the atmosphere.

To form an oxide passivation film on a large complicated apparatus and a piping system, an oxide passivation film forming apparatus is also complicated and the cost increases. Therefore, a welding method making it possible to form a passivation film simultaneously with welding was strongly requested.

One object of the present invention is to provide a welding method making it possible to form an oxide passivation film having corrosion resistance and discharging only a very small quantity of out-gas on and around a weld during the welding process.

Another object of the present invention is to provide a process apparatus requiring a very-high-cleanliness atmosphere.

SUMMARY OF THE INVENTION

The welding method of the present invention for forming an oxide passivation film on a weld is characterized by flowing a back-shielding gas made of an inert gas containing 1 ppb to 50 ppm of oxygen gas through the welding process to form a oxide passivation film containing chromium oxide as a main component on the surface of the weld.

Moreover, the process apparatus of the present invention is characterized by flowing a back-shielding gas made of an inert gas containing 1 ppb to 50 ppm of oxygen gas through the welding process to form a oxide passivation film containing chromium oxide as a main component on the surface of the weld.

It is possible to form a high-density oxide passivation film containing chromium oxide as a main component on the surface of a weld simultaneously with welding by adding a proper quantity of oxygen to a back-shielding gas during welding.

The oxygen content in the back-shielding gas is a very important factor to form an oxide passivation film and the proper oxygen content range is 1 ppb or more to 50 ppm or less. In particular, the range of 100 ppb to 1 ppm is preferable. In this range, the chromium-oxide content in an oxide passivation film increases and the density of the oxide passivation film further increases. With a content of 1 ppb or less, however, an oxide passivation film with sufficient thickness is not formed. With a content of 50 ppm or more, the chromium oxide content decreases and a film with a high density and a large adhesive force is not obtained.

By adding 1 to 10% of hydrogen to the back-shielding gas, an oxide passivation film with larger chromium-oxide content is formed. Though a detailed reason why such a film is formed is not clear, it is estimated that oxidation and reduction occur simultaneously by adding hydrogen, chromium is selectively oxidized, and a reaction for reducing iron occurs.

In the present invention, it is also possible to form an oxide passivation film mainly containing chromium oxide on the surface of a weld by adding oxygen gas to a back-shielding gas when the temperature of the weld has dropped to a predetermined value immediately after welding. Moreover, it is possible to form an oxide passivation film while keeping a weld at a predetermined temperature by using proper weld heating means. In this case, it is possible to increase the thickness of the passive film compared with the case of using no heating means.

The quantity of oxygen to be added to form an oxide passivation film after welding is 100 ppb to 100 ppm. In the case of 100 ppb or less, a oxide passivation film with a sufficient thickness is not formed, and in the case of 100 ppm or more, a film with small chromium-oxide content, high density, and large adhesive force is not obtained.

Even in this case, it is preferable to add 1 to 10% of hydrogen to the back-shielding gas because of the above-mentioned reason.

Welding with an electric discharge or laser is used. Welding with an electric discharge includes tungsten-inert gas welding and arc gas welding.

The process apparatus of the present invention includes a semiconductor fabricating apparatus, superconducting thin-film forming apparatus, magnetic film forming apparatus, metallic film forming apparatus, and dielectric thin-film forming apparatus. Specifically, they are film forming apparatus and treating apparatus for sputtering, vacuum deposition, CVD, PCVD, MOCVD, MBE, dry etching, ion implantation, and diffusion and oxidation furnaces and evaluating apparatus for Auger electron spectroscopy, XPS, SIMS, RHEED, and TREX. Moreover, a piping system for feeding gas and an ultrapure-water producing and feeding apparatus are also included in the process apparatus of the present invention.

DETAILED DESCRIPTION OF THE INVENTION

The present invention is described below in detail in accordance with the following embodiments.

In the first embodiment, an oxide passivation film containing much chromium is formed on the inner surface of a SUS3161L pipe with a diameter of ¼ in (6.35 mm) by applying electrolytic polishing to the pipe and thereafter oxidizing the pipe in an atmosphere of oxygen and argon gases with water content of 10 ppb.

Then, the SUS3161L pipe in which the oxide passivation film is formed is welded by the tungsten-inert gas welding method. The welding is performed by using Ar gas containing 10% of $H_2$ gas as a back-shielding gas and adding $O_2$ gas with various concentrations. Obtained welded pipes are classified into the following four types of samples: (a) not-added sample, (b) 100-ppb sample, (c) 1-ppm sample, and (d) 10-ppm sample.

Figure 1:
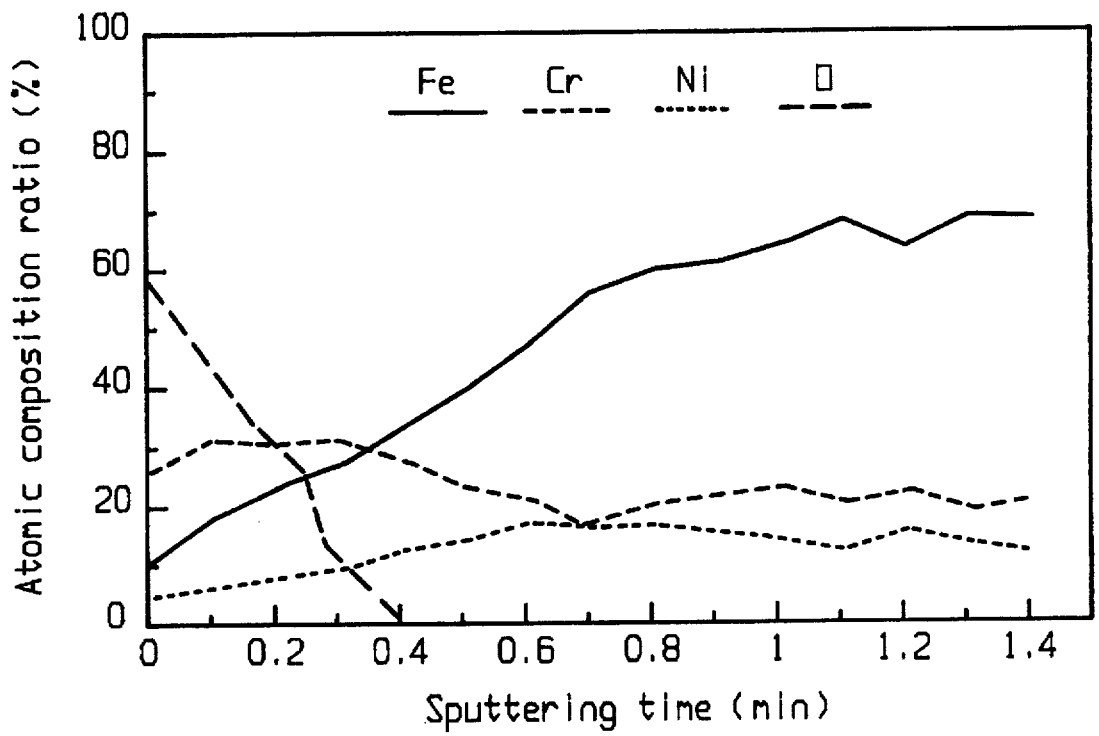
FIG. 1 is a graph showing the oxygen gas (not added) contained in a back-shielding gas under welding and the composition distribution in the depth direction of a weld.

After welding, the pipes are cut to examine the composition distribution in the depth direction from the surface of a weld by means of XPS (X-ray Photoelectron Spectroscopy). The examined results are shown in FIG. 1 {for sample (a)}, FIG. 2 {for sample (b)}, FIG. 3 {for sample (c)}, and FIG. 4 {for sample (d)}. In FIGS. 1 to 4, oxygen is added to the back-shielding gas. In FIG. 1 to 4, the axis of abscissas represents surface etching time by sputtering and the etching time for 1 min corresponds to a film thickness of approx. 10 nm.

Figure 2:
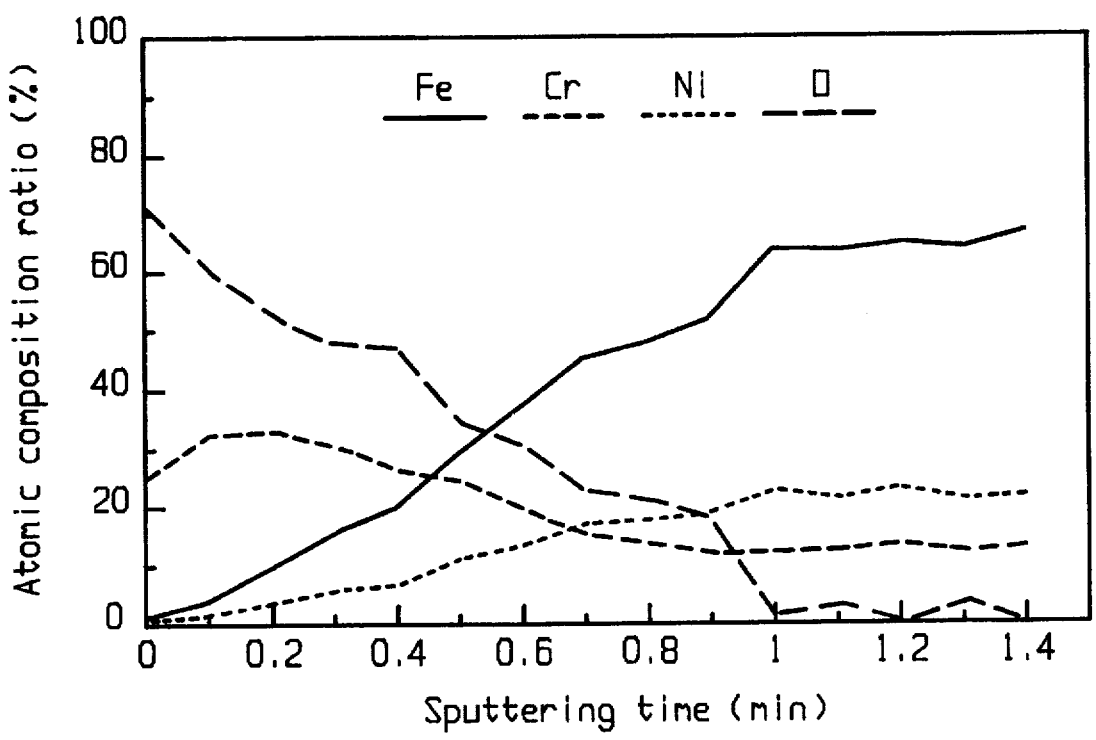
FIG. 2 is a graph showing the oxygen gas (100 ppb) contained in a back-shielding gas under welding and the composition distribution in the depth direction of a weld.
Figure 3:
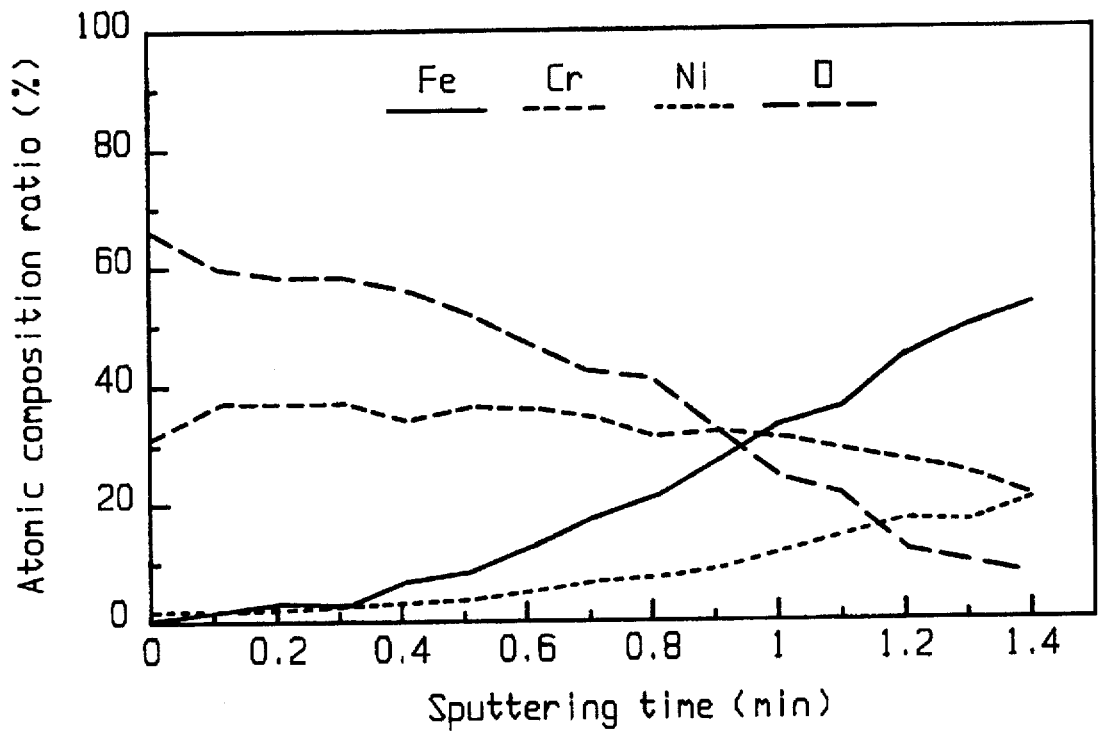
FIG. 3 is a graph showing the oxygen gas (1 ppm) contained in a back-shielding gas under welding and the composition distribution in the depth direction of a weld.
Figure 4:
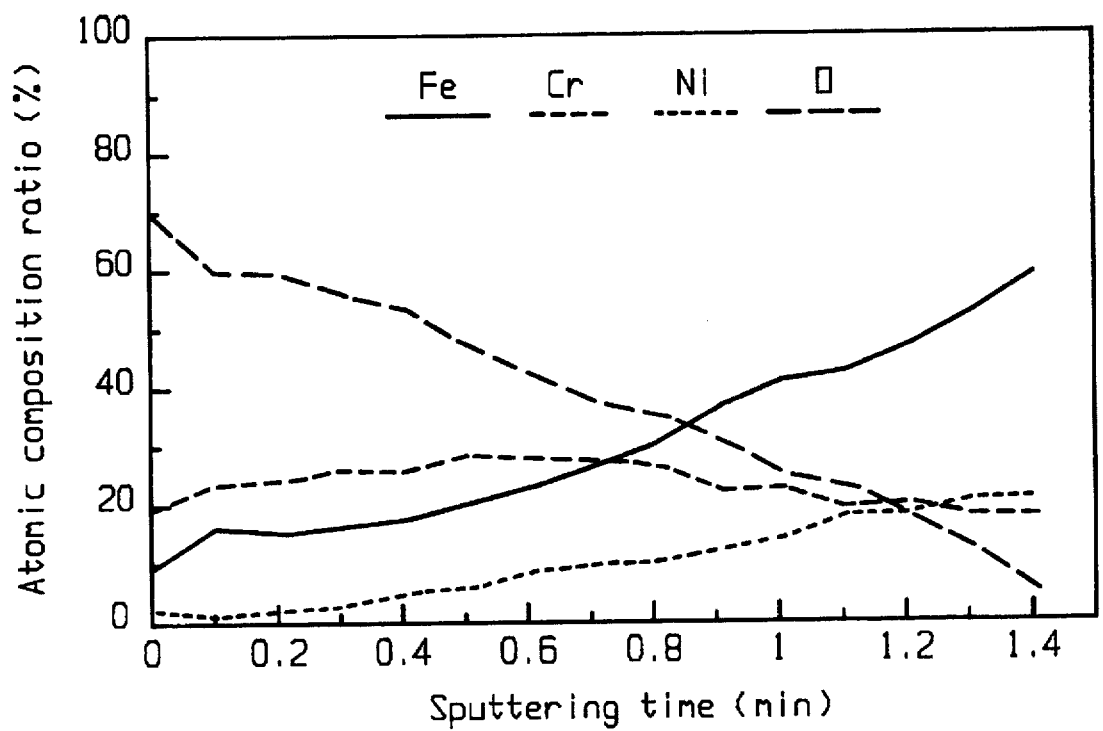
FIG. 4 is a graph showing the oxygen gas (10 ppm) contained in a back-shielding gas under welding and the composition distribution in the depth direction of a weld.

From FIGS. 2 to 4, it is found that an oxide passivation film containing much chromium oxide is formed on a weld when performing welding by adding 100 ppb to 10 ppm of oxygen to the back-shielding gas. Particularly from FIGS. 2 and 3, it is found that an excellent oxide passivation film containing much chromium oxide can be formed especially when the added oxygen quantity is 100 ppb to 1 ppm. When the added oxygen quantity exceeds 50 ppm, the content of iron oxide is large than that of chromium oxide and a film with a sooty surface is obtained.

Then, HCl gas containing 1.4 ppm of water is injected into a welded pipe up to 2.5 kg/cm² and left undisturbed for 12 hr. Thereafter, the pipe is cut to observe the inner surface of the pipe.

As a result, corrosion is observed on the weld surface of sample (a) in FIG. 1, but no corrosion is observed on the surfaces of samples (b) in FIG. 2, (c) in FIG. 3, and (d) in FIG. 4 similar to a non-welded portion. Therefore, it is found that an oxide passivation film excelling in corrosion resistance can be formed by the welding method of the present invention.

To examine the deoutgassing characteristic of a weld, ten SUS316L pipes in which an oxide passivation film with a length of 50 cm is formed are welded under the conditions (a) and (c), respectively, and left in a clean room for one week. Thereafter, the degassing characteristic is evaluated by flowing Ar gas through each welded pipe and measuring the water quantity contained in the Ar gas at the exit of the pipe with an APIMS (Atmospheric Ionization Mass Spectrometer).

In the case of the sample welded under condition (a), it takes 40 min for the water content in Ar gas to reach the background level of 3 ppb. In the case of the sample (c) of this embodiment, however, the water content reaches the background level in 15 min. Therefore, it is found that a oxide passivation film superior in the degassing characteristic can be formed by the welding method of the present invention.

In the second embodiment, an SUS316L pipe with a diameter of 1.4 in (6.35 mm) is welded by the tungsten-inert gas welding method while flowing Ar gas containing 1% of $H_2$ gas as a back-shielding gas. After welding, a weld is kept at 500° C. by a heater set to a welding head and the back-shielding gas added with 1 ppm of $O_2$ gas is continuously flown through the pipe for 30 min.

Figure 5:
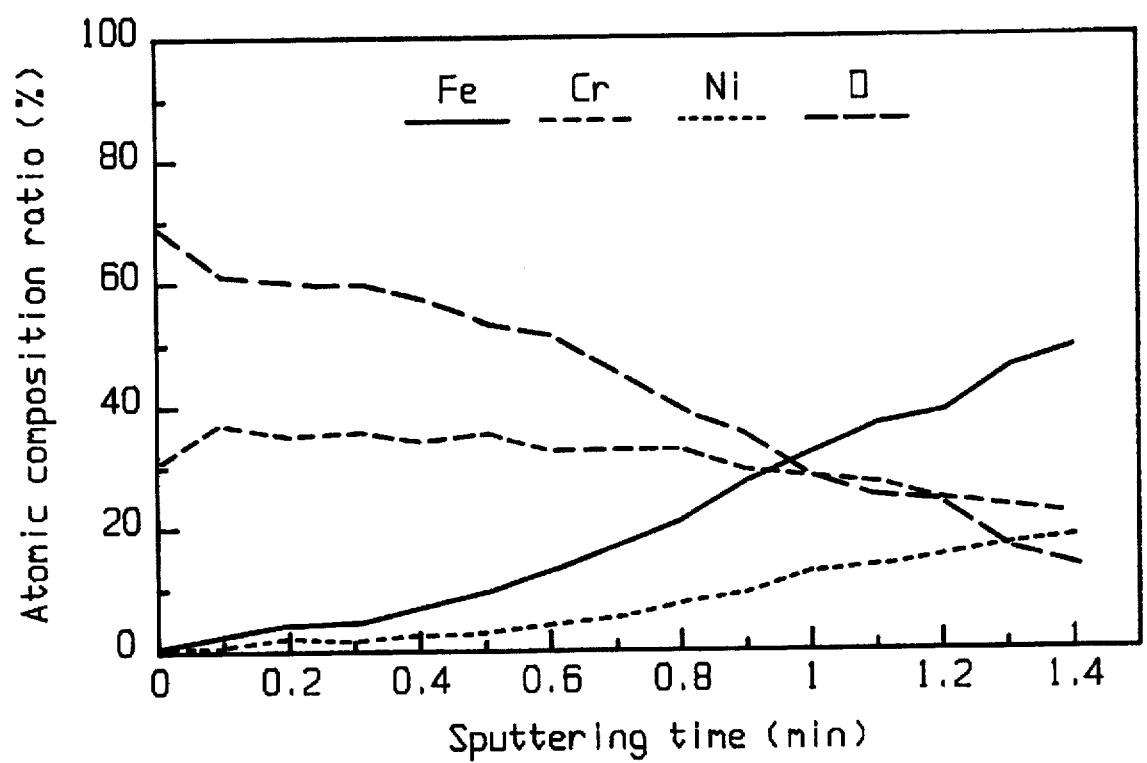
FIG. 5 is a graph showing the composition distribution in the depth direction of an oxide passivation film obtained by adding oxygen gas into a back-shielding gas after welding.

Thereafter, the pipe is cut to analyze the composition distribution in the depth direction from the surface of the weld by means of XPS similarly to the case of the first embodiment. The analyzed result is shown in FIG. 5. From FIG. 5, it is found that an oxide passivation film containing much chromium oxide is formed on the surface of the weld even by the method of this embodiment.

Figure 6:
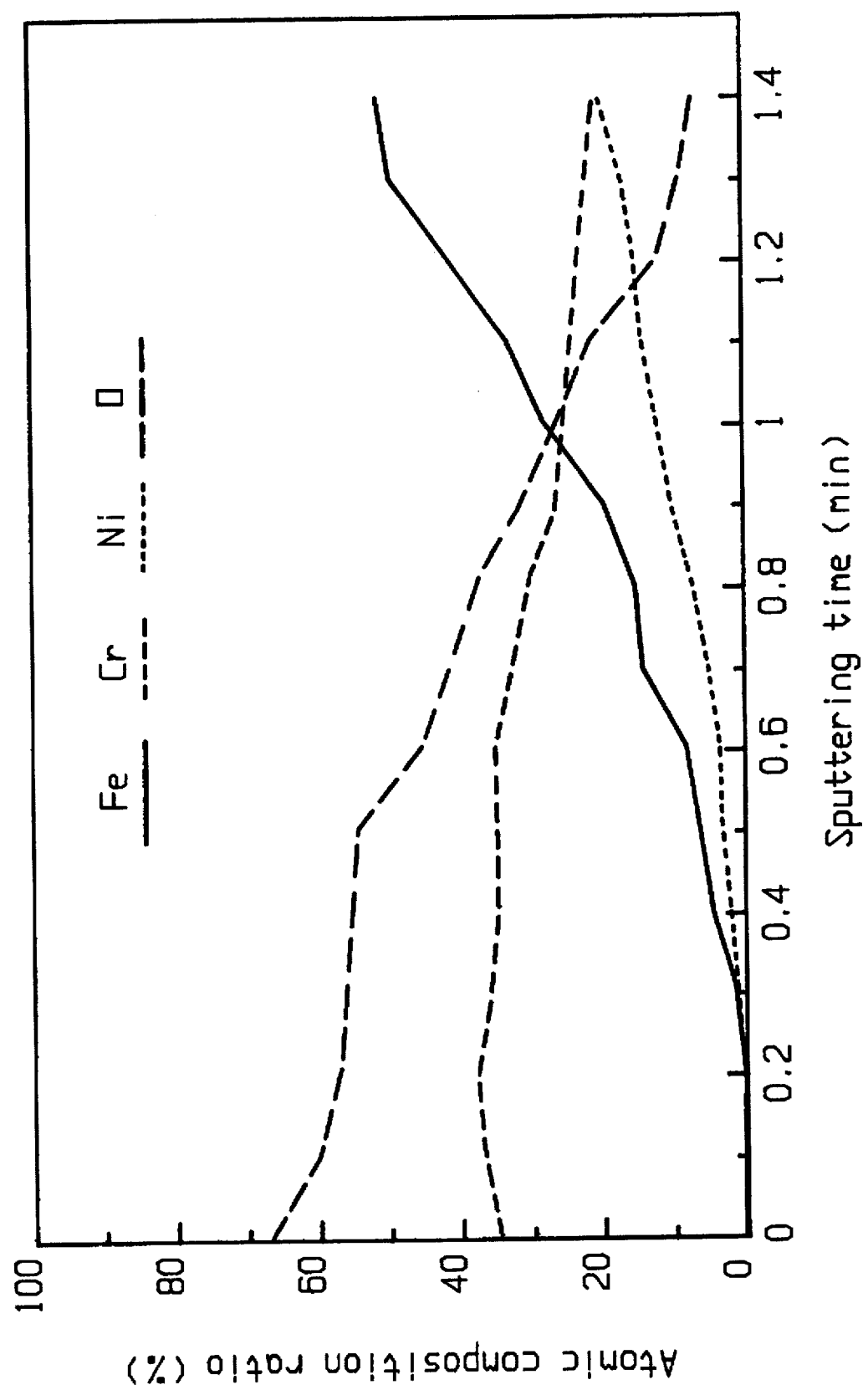
FIG. 6 is a graph showing the result of XPS analysis of the oxide passivation film in the third embodiment.

In the third embodiment, an SUS316L electrolytic-polished pipe with a diameter of ¼ in (6.35 mm), on whose inner surface an oxide passivation film containing much chromium described in the first embodiment is formed, is welded and then rinsed with ultrapure water to remove metallic particles from the downstream side of the weld. After removing the metallic particles, the weld is kept at 500° C. by a heater and Ar gas added with 1 ppm of 10%-$H_2$ and 10%-$O_2$ gases is continuously flown through the pipe for 30 min. Thereafter, analysis is performed by means of XPS in the same manner as the cases of the first and second embodiments. The analyzed result is shown in FIG. 6. From FIG. 6, it is found that an oxide passivation film containing much chromium oxide can be formed on the surface of the weld even by the method according to this embodiment.

Figure 7:
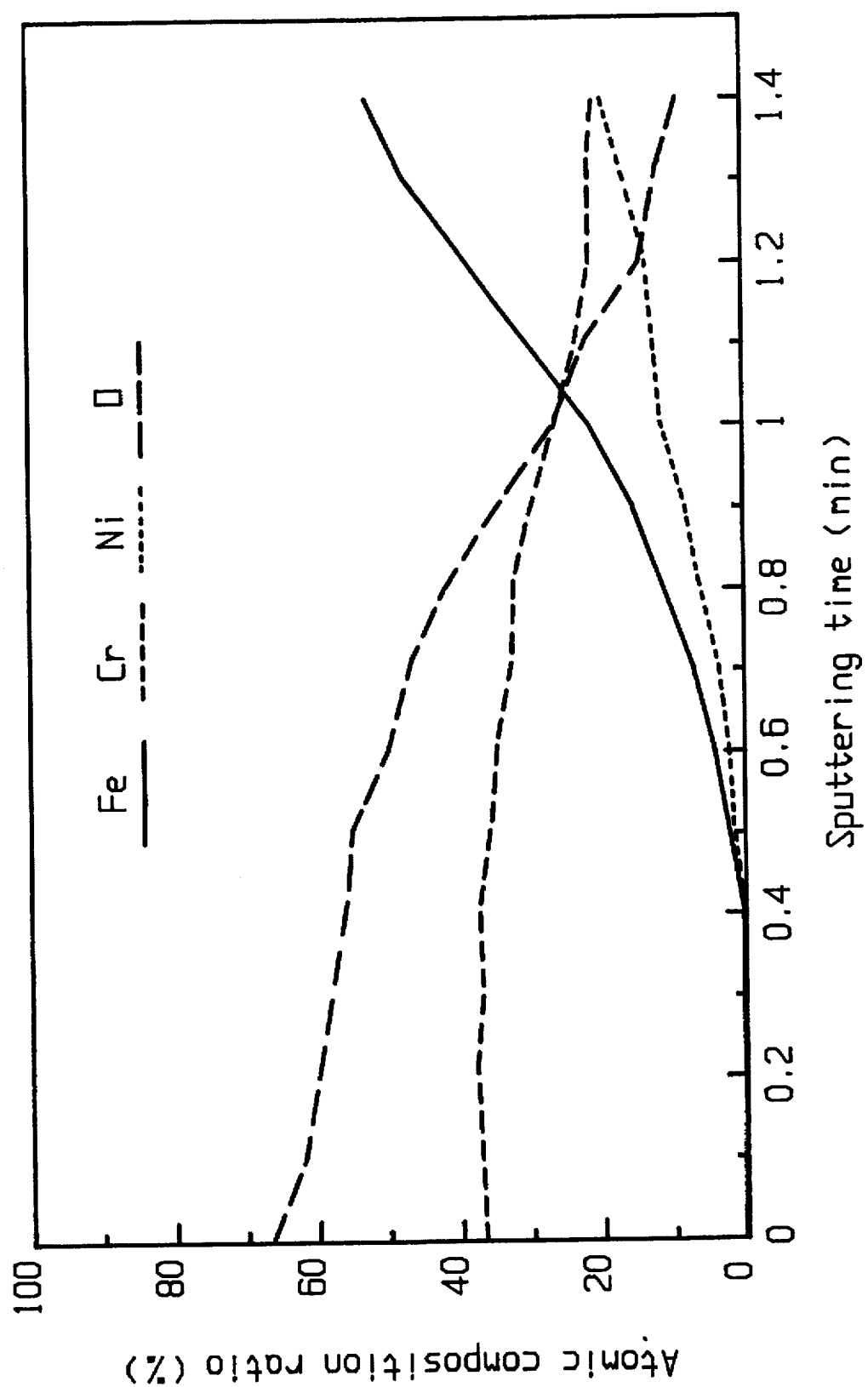
FIG. 7 is a graph showing the result of XPS analysis of the oxide passivation film in the fourth embodiment.

In the method described in the fourth embodiment, electrolytic polishing is used as a means for removing metallic particles from the downstream side of a weld after welding and then the same thermal treatment is performed. FIG. 7 shows the result of analysis by XPS. From the result, it is found that an oxide passivation film containing much chromium oxide is formed on the surface of a weld even by the method of this embodiment at a thickness larger than the thickness shown in the third embodiment.

As described above, the present invention makes it possible to passivate a weld during the welding process and moreover easily provide a very-high-cleanliness process apparatus, a high-purity-gas feeding piping system, and an ultrapure water producing and feeding apparatus without using any special apparatus.

We claim:

1. A welding method for forming an oxide passivation film on a weld, comprising the step of:

flowing a back-shielding gas made of an inert gas containing 1 ppb to 50 ppm of oxygen gas through the welding process to form an oxide passivation film containing chromium oxide as the main component on the surface of said weld.

2. The welding method for forming an oxide passivation film on a weld according to claim 1, wherein the back-shielding gas contains 1 to 10% of hydrogen gas.

3. An oxide passivation film forming method comprising the steps of:

rinsing a weld with ultrapure water after welding to remove metallic particles from the downstream side of said weld; and thereafter flowing a back-shielding gas made of an inert gas containing 1 ppb to 50 ppm of oxygen gas through the welding process, and thereby forming an oxide passivation film containing chromium oxide as a main component on the surface of said weld.

4. The oxide passivation film forming method according to claim 3, wherein said back-shielding gas contains 1 to 10% of hydrogen gas.

5. The oxide passivation film forming method according to claim 3, wherein electrolytic polishing is used to remove metallic particles attached to said downstream side of said weld.

6. The oxide passivation film forming method according to claim 4, wherein electrolytic polishing is used to remove metallic particles attached to said downstream side of said weld.

* * * * *